United States Patent Office 2,942,782
Patented June 28, 1960

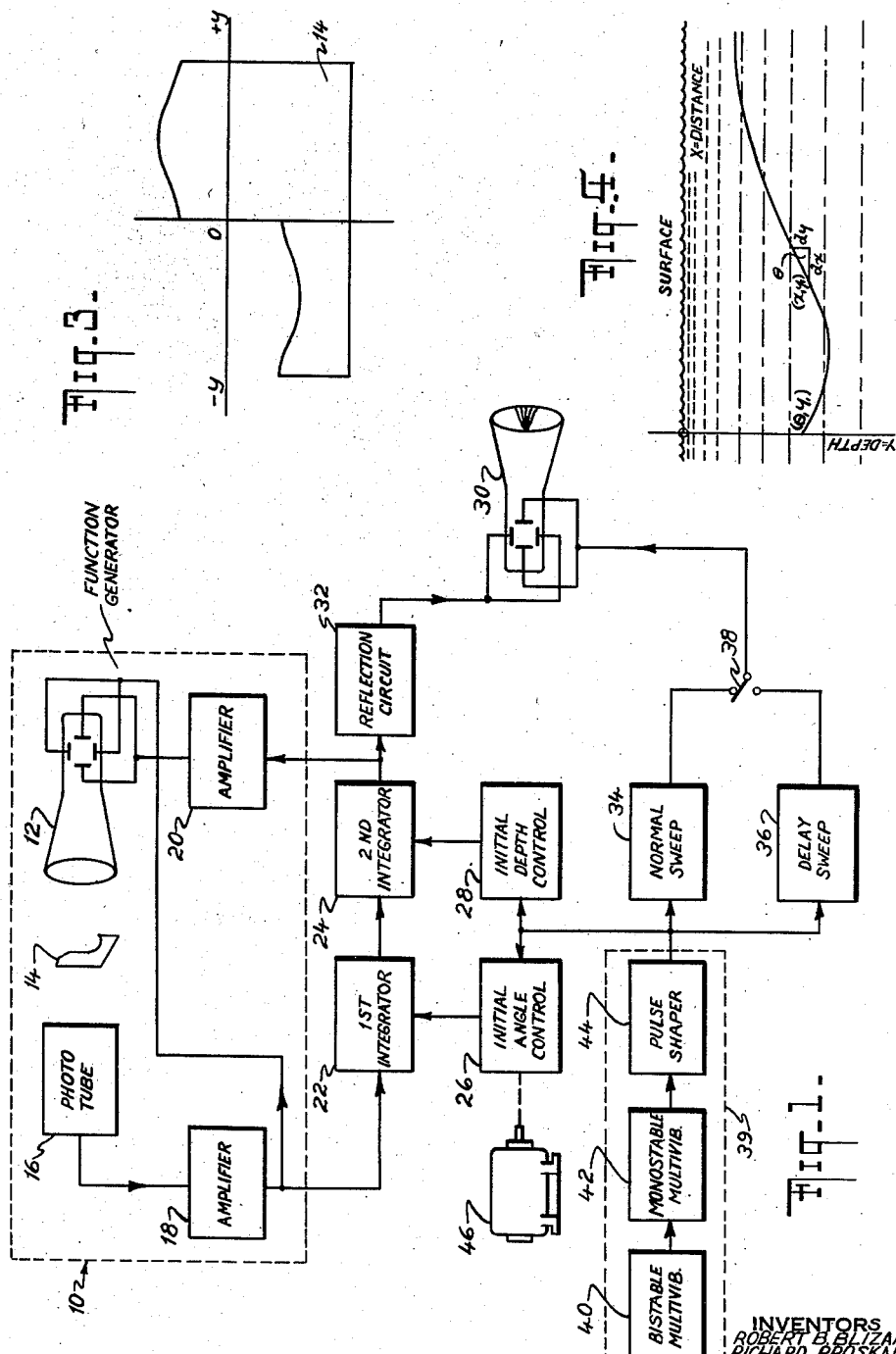

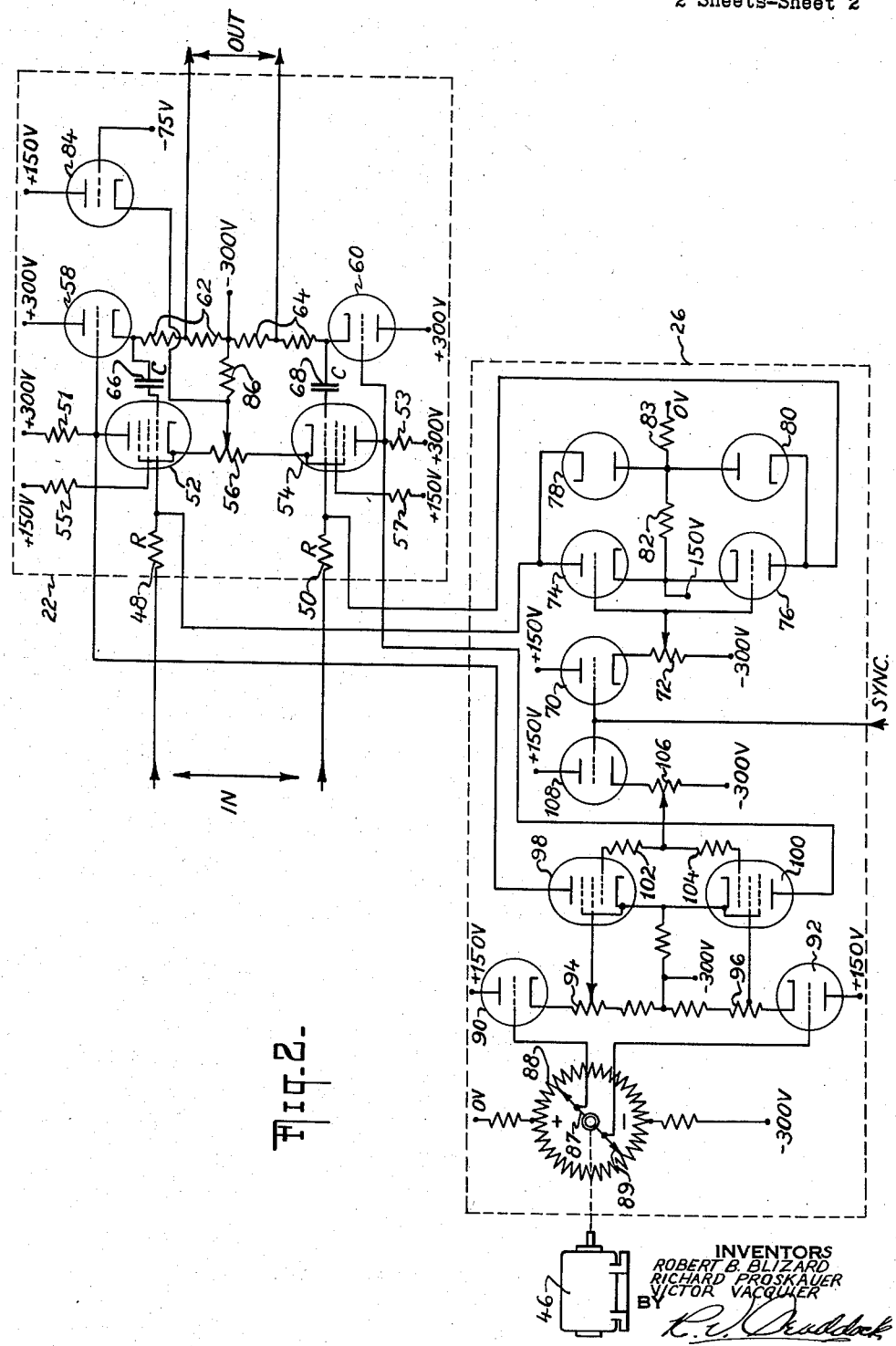

2,942,782

SONAR RAY TRACER

Robert B. Blizard, Houston, Tex., Richard Proskauer, Westbury, N.Y., and Victor Vacquier, La Jolla, Calif., assignors to Sperry Rand Corporation, a corporation of Delaware Continuation of application, Ser. No. 436,168, June 11, 1954. This application Jan. 26, 1955, Ser. No. 484,212

11 Claims. (Cl. 235—182)

This invention relates to analogue computers, and more particularly, is concerned with a computer for tracing the paths of underwater sound rays as predicated from sound velocity versus depth data. This application is a continuation of application Serial No. 436,168, filed June 11, 1954, and now abandoned.

It is well known that sound rays emanating from a source underwater do not follow straight lines, but are bent due to the change in velocity of the rays at different depths. The resulting sound intensity pattern is rather complex, being made up of regions of greater sound intensity due to the convergence of a number of rays following different paths, and regions of low intensity where substantially no rays may pass. A plot of a set of rays provides a picture of the sound field, and by plotting a large number of rays, the density of the rays at various points is an indication of the sound intensity.

Heretofore it has been the practice to plot individual rays from measured data and computation, but because of the tremendous amount of work required, only a few rays were plotted for each picture of a sound field. Moreover, the number of such graphs representing different depths and different conditions affecting the sound field pattern which could be made by hand was necessarily limited. A mechanical computer and plotter was developed which was capable of tracing ten or fifteen rays an hour, which was a great improvement over the manual method. However, no satisfactory method has been heretofore developed for a high speed plot of a large number of rays from a source of infinitely variable depth.

It is the general object of this invention to avoid the foregoing limitations in the prior art methods by the provision of an improved sonar ray tracer whch is capable of very rapidly computing and plotting a family of sound rays from measured data of sound velocity in a medium as a function of depth.

Another object of this invention is the provision of a sound intensity predictor producing a family of traces on a cathode ray screen corresponding to rays of a sound field wherein the density of the traces on the screen is an indication of the corresponding sound intensity in the sound field.

Another object of this invention is to provide an electronic ray tracer which can be used in any type of investigation involving the propagation of ray energy through any medium.

These and other objects of the invention which will become apparent as the description proceeds are achieved by the provision of a computer including a first integrator and second integrator connected in cascade. An electronic function generator for producing an output signal that is a predetermined function of an input signal has its input connected to the output of the second integrator and its output connected to the input of the first integrator. The predetermined function is established from velocity versus depth data. A cathode ray tube is connected with its vertical deflection plates coupled to the output of the second integrator and with its horizontal deflection plates coupled to the output of a sweep generator. Means is provided for periodically resetting the initial condition of the first integrator to change the initial angle of the ray traced on the cathode ray screen whereby a family of traces each having a different initial angle from a source of predetermined depth is plotted on the cathode ray screen. Means is also provided for adjusting the initial condition of the second integrator whereby the depth of the source of the rays traced on the cathode ray screen may be varied.

For a better understanding of the invention, reference should be had to the accompanying drawings, wherein:

Fig. 1 is a block diagram of the computer comprising the present invention;

Fig. 2 is a wiring diagram of one of the integrators together with the circuit for setting in the initial condition;

Fig. 3 is a front elevation of a mask used in the function generator of the computer; and Fig. 4 is a graphical plot of a typical ray used in developing the equations for the ray paths.

The principles of the present invention can best be understood by considering a transducer located at a depth $y_1$ below the surface of the ocean, the transducer sending out sound rays over an angle in the vertical plane. As long as a particular sound ray travels in a medium in which the velocity is constant, it will be directed along a straight line. However, as soon as the ray passes into a medium in which the velocity of propagation is different, the ray will be bent and will proceed in the second medium along a different line. This phenomenon is known as Snell's law of refraction, which is expressed mathematically:

$$\frac{\cos \theta_1}{V_1} = \frac{\cos \theta_{(y)}}{V_{(y)}} = k \tag{1}$$

where $V_1$ is the velocity in a first medium, $V_{(y)}$ the velocity in another medium, and $\theta$, and $\theta_{(y)}$ are the respective angles in the two mediums to the horizontal.

Referring to Fig. 4, there is shown a plot of a typical ray emanating from a source at an initial angle of $\theta_1$ and at a depth of $y_1$. The general equation for the curve defined by any such ray may be derived as follows:

Consider a single ray as plotted in Fig. 4. The slope of the ray at a point $(x, y)$ is $$\frac{dy}{dx} = \tan \theta = y' \tag{2}$$

and the rate of change of slope is $$\frac{d^2y}{dx^2} = \frac{d \tan \theta}{dx} = y'' \tag{3}$$

where $\theta$ is the angle with horizontal made by a tangent to the ray curve at the point $(x, y)$. According to Snell's law, as above stated in Equation 1, $$\cos \theta = kV \tag{4}$$

Solving for $y'$ in terms of $V$ by using Equations 2 and 4, $$y' = \tan \theta = \frac{\sin \theta}{\cos \theta} = \frac{\sqrt{1-\cos^2 \theta}}{\cos \theta} = \frac{\sqrt{1-(kV)^2}}{kV} \tag{5}$$

Taking the derivative of Equation 5 gives $$y'' = -\frac{1}{(kV)^2} \cdot \frac{1}{V} \cdot \frac{dV}{dy} = \frac{-1}{\cos^2 \theta} \cdot \frac{1}{V} \cdot \frac{dV}{dy} \tag{6}$$

This is a general equation for the path of a ray in terms of depth versus distance.

To simplify the solution of Equation 6 it may be assumed that only rays making small angles to the horizontal are to be plotted, so that $\cos^2 \theta$ is approximately equal to unity. Since it is easier to use time as the independent variable in any computer, Equation 6 is further simplified by the assumption that the component of velocity of the ray in the horizontal direction is substantially constant. This assumption is valid since the velocity actually varies only slightly at different depths, so that the average velocity $V_{av}$ may be used. Thus $x$ becomes proportional to time, as expressed in the equation $$x = V_{av}t \quad (7)$$

Differentiating Equation 7, $$\frac{dx}{dt} = V_{av} \quad (8)$$

Therefore $$\frac{dy}{dx} = \frac{dy}{dt}\frac{dt}{dx} = \frac{dy}{dt}\frac{1}{V_{av}}$$

and $$\frac{d^2y}{dx^2} = \frac{1}{V_{av}^2}\frac{d^2y}{dt^2} \quad (9)$$

Substituting Equation 9 into Equation 6 gives $$\ddot{y} = \frac{d^2y}{dt^2} \approx -\frac{V_{av}^2}{V}\frac{dV}{dy} \quad (10)$$

This equation establishes that the rate of change of slope $\ddot{y}$ of a particular ray is proportional to the vertical rate of change of velocity $$\frac{dV}{dy}$$

divided by the velocity $V$.

The velocity of sound in the sea as function of depth for various conditions has been established by bathothermograph measurements which are available in the form of published charts. By utilizing this information the computer of the present invention provides a solution of Equation 10 of depth $y$ (for a ray having any selected initial condition of depth and angle) as a function of time, the computer presenting the solution as a trace on a cathode ray tube.

Referring to the block diagram of the computer in Fig. 1, the numeral 10 indicates generally a function generator which is preferably of a type described in the article "Photoelectric Waveform Generator," by D. E. Sunstein, Electronics, February 1949, page 100. The function generator is capable of producing a single-value transfer characteristic from a simple mask. It includes a cathode ray tube 12 in front of which is positioned an opaque mask 14. The shape and method of forming the mask will be hereinafter more particularly described. A phototube 16 feeds a servo amplifier 18, the output of which is coupled to the vertical deflection plates of the cathode ray tube 12. The amplifier 18 is so biased that the spot on the cathode ray tube is deflected up to the top of the screen in the absence of a signal from the phototube. If the spot is not behind the opaque area of the mask, the phototube will detect it and deliver to the amplifier 18 a signal having a polarity such that the spot will be deflected downward. The combined effect of the upward deflection signal as a result of the bias and the downward deflection signal from the phototube causes the amplifier 18 to position the spot at the upper edge of the mask. The output voltage from the amplifier 18 therefore is a function of the vertical height of the mask. The horizontal deflection plates of the cathode ray tube 12 are coupled by means of an amplifier 20 to a suitable deflection voltage source, as hereinafter described.

From the above description of the function generator it will be appreciated that the output voltage signal from the amplifier 18 may be any desired function of the input voltage at the amplifier 20 as determined by the shape of the upper edge of the mask 14. For the purpose of the present invention, in accordance with the requirements of Equation 10, the mask is formed with the upper edge conforming with a plotted curve of the value of the velocity gradient function $$\frac{dV}{Vdy}$$

as derived from bathothermograph data, against depth. With the voltage on the horizontal deflection plates varied in proportion to depth, the output voltage, and the voltage on the vertical deflection plates, is varied in proportion to the velocity function $$\frac{dV}{Vdy}$$

The output from the function generator 10 is fed to a first integrator 22 and second integrator 24 connected in cascade. The output from the second integrator is therefore the second time integral of the quantity $$\frac{dV}{Vdy}$$

which according to the Equation 10 is the depth $y$ of the ray.

The initial conditions of slope and depth of the ray are established in the first and second integrators respectively by means of adjustable control circuits 26 and 28. These circuits will hereinafter be described in more detail. The depth control circuit 28 establishes an output at the second integrator 24 corresponding to the initial depth of the ray whose path is being computed. This in turn controls the initial output of the function generator 10, as determined by the mask 14. The output from the second integrator 24 will then vary with time from its initial value in accordance with the solution of Equation 10.

To plot the path of the ray corresponding to the output of the second integrator 24, a cathode ray tube 30 is provided. The vertical deflection plates of the tube 30 are coupled to the output of the integrator 24 through a reflection circuit 32. The reflection circuit 32 may be a full wave rectifier which maintains a constant polarity output regardless of changes of polarity of the output of the second integrator 24. This circuit provides for the condition where the depth of the ray becomes negative, that is, where the ray reaches the surface of the water and is reflected downward again.

A sweep circuit 34 is connected to the horizontal deflection plates of the cathode ray tube 30 to provide a linear time base, whereby a plot of depth as a function of time is traced on the face of the cathode ray tube 30. A conventional delay sweep circuit 36 is provided which may be connected by a switch 38 in place of the normal sweep 34 to the horizontal deflection plates of the cathode ray tube 30. The delay sweep makes it possible, if desired, to enlarge and examine a portion of the ray trace on the cathode ray tube 30.

A synchronizing circuit 39, including a bistable multivibrator 40, a monostable multivibrator 42 triggered by the multivibrator 40, and a pulse shaper circuit 44, is connected to the sweep circuits 34 and 36, as well as to the initial angle control circuit 26 and initial depth control circuit 28. This synchronizing circuit produces an output pulse having a time duration of preferably 1/600 of a second, as determined by the recovery time of the monostable multivibrator 42, and a repetition frequency of 60 cycles per second as determined by the bistable multivibrator 40. These pulses from the output of the pulse shaper 44 trigger the initial control circuits 26 and 28 to reset the initial condition on the first integrator 22 and second integrator 24 once every 60th of a second. Thus a ray trace on the scope 30 is continuously retraced.

In order that a family of rays emanating from a single point at some initial depth as determined by the setting of the initial depth control circuit 28 may be presented on the scope 30, means is provided for automatically changing the initial angle control circuit 26 so that successive rays, each with a different initial slope, may be plotted. For this purpose a motor drive, as indicated at 46, is provided for automatically shifting the initial angle control.

Referring to Fig. 2, the first integrator circuit 22 and initial angle control circuit 26 are shown in more detail. The integrator 22 is a common electronic type of integrator using a double-ended amplifier employing feedback to accomplish the integration. The input signal is coupled through series resistors 48 and 50 to the control grids of a pair of pentode amplifier tubes 52 and 54. The cathodes of the amplifier tubes 52 and 54 are connected together through a balance control potentiometer 56 to a negative voltage source. The plates and screen grids of respective amplifier tubes 52 and 54 are connected in a conventional manner to suitable positive voltage sources through resistors 51, 53, 55 and 57. The output of the tubes 52 and 54 are connected to cathode followers including triodes 58 and 60, the cathodes of which are connected to a negative voltage source through cathode resistors 62 and 64 respectively. The output from the integrator 22 is derived across portions of the cathode resistors 62 and 64 to allow the output to be obtained at the proper D.-C. level. Negative feedback is provided by the capacitors 66 and 68 which are respectively connected between the cathode of the cathode follower tube 58 and the control grid of the amplifier tube 52 and the cathode of the cathode follower tube 60 and control grid of the amplifier tube 54. While the integrator has been disclosed and described as a double-ended circuit, it will be understood that a single-ended integrator circuit can be used.

The operation of the integrator 22 can best be understood by considering an initial charge placed on the capacitor 66. In the absence of an input signal, this charge will leak off through the loop consisting of the series resistor 48, the internal impedance of any driving circuit across the input to the integrator, and the cathode resistor 62. This leakage constitutes a current and produces a change in voltage on the control grid of the amplifier tube 52. As a result, a voltage is produced at the cathode of the cathode follower tube 58 which substantially cancels the loss in charge of the capacitor 66. Thus the amplifier acts as an R-C integrator whose time constant is greater than the R-C product by a factor of approximately the gain of the amplifier. When an input signal is applied to the control grid of the amplifier tube 52, by virtue of the action above described, the voltage at the cathode of the cathode follower 58 is the integral of the input voltage from an initial D.-C. level determined by the initial charge on the condenser 66.

To insert the initial condition into the integrator, the amplifier must be cut off and a charge proportional to the initial condition placed on the integrating capacitors 66 and 68. This is accomplished during the duration of a synch pulse from the output of the pulse shaper 44 by means of the initial angle control circuit 26.

A fixed potential at the input end of the feedback capacitors 66 and 68, as coupled to the control grids of the tubes 52 and 54, is set in the following manner. A synch pulse from the output of the pulse shaper 44 is connected through a cathode follower including a triode 70 and cathode load potentiometer 72 to the grids of a pair of triodes 74 and 76 having their cathodes connected together to a fixed negative potential source. The plates of the triodes 74 and 76 are connected respectively to the control grids of the amplifiers 52 and 54, so that these control grids are driven negative by the synchronizing pulse from the pulse shaper 44. The potential on the control grids of the tubes 52 and 54 is fixed during this interval by a pair of diodes 78 and 80 having their plates held at approximately —75 v. by a voltage divider including resistors 82 and 83. The cathodes of the diodes 78 and 80 are connected to the plates of the triodes 74 and 76 limiting their drop in potential to —75 v.

A cathode follower including a triode 84 in the integrator circuit 22 has its cathode resistor 86 in common with the cathode circuits of the amplifier tubes 52 and 54. The grid of triode 84 is connected to a fixed potential of —75 v., so that the cathodes of the amplifier tubes are prevented from dropping with the drop in potential of the control grids below this potential. Thus the amplifier tubes 52 and 54 are cut off by the synchronizer pulse. The circuit provided by the cathode follower tube 70, triodes 74 and 76, and diode limiters 78 and 80 may be considered as a switch, actuated during the time of a synch pulse, for connecting one end of the feedback capacitors 66 and 68 to fixed potential source of —75 v.

During the time the amplifier tubes 52 and 54 of the integrator circuit are thus cut off, the desired initial charge is placed on the capacitors 66 and 68 by connecting an adjustable potential to the other ends of these capacitors. This is done by the portion of the circuit 26 including a motor driven potentiometer 88. The potentiometer 88 is preferably a linear 360° potentiometer with two insulated diametrically opposed wiper contacts 87 and 89 which are rotated by the motor 46. Rotation of the motor 46 produces a changing potential between the contacts 87 and 89. The output of the potentiometer 88 is connected between the grids of two cathode follower tubes 90 and 92, the cathodes of which are connected to load potentiometers 94 and 96 from which a balanced output may be derived. The output may be deliberately unbalanced to simulate an unsymmetrical transducer.

A pair of pentodes 98 and 100 have their plates connected to the plates of the amplifier tubes 52 and 54. The control grids of the tubes 98 and 100 are connected by means of resistors 102 and 104 to a potentiometer 106 in the cathode circuit of a cathode follower 108. The synch signal from the pulse shaper 44 is fed to the control grid of the cathode follower 108 so as to bias the tubes 98 and 100 conductive during the duration of the synch pulse. By connecting the screen grids of the pentodes 98 and 100 to the output of the cathode followers 90 and 92, during the period of a synch pulse, the instantaneous potentials at the wiper contacts 87 and 89 determine respectively the potentials at the plates of the tubes 52 and 54 and hence the potentials at the cathodes of the cathode follower tubes 58 and 60. Thus the circuit including the cathode follower tubes 90 and 92, and pentodes 98 and 100, acts as a switch for momentarily connecting the feedback capacitors 66 and 68 to a variable source 88 of potential.

By providing an 11:12 gear ratio between the motor 46 and potentiometer 88, and by operating the motor at the synchronous speed of one revolution per second, the same initial condition is inserted into the integrator only once every twelve revolutions of the motor. Thus twelve times sixty or 720 traces, each with a different initial angle, are provided on the cathode ray screen 30.

The second integrator 24 and the initial depth control circuit 28 are substantially identical to the circuits 22 and 26 as above described, except that a manual control of the potentiometer 88 is provided in place of the motor 46 for setting the initial depth. It will be appreciated that since the output of the first integrator is proportional to the first derivative of the depth $y$, that the initial setting of the first integrator determines the initial slope of the ray being traced. Likewise, since the output of the second integrator is proportional to the depth $y$, the initial output of the second integrator determines the initial depth of the ray traced on the screen 30.

In addition to setting the initial conditions into the computer, it is necessary that a proper mask 14 be prepared corresponding to the sound velocity versus depth relationship of the region under investigation. As mentioned earlier, such information is available from bathothermograph measurements which have been taken at a great number of spots in the oceans of the world.

In laying out the mask, to provide for surface reflection phenomena, the origin, corresponding to the zero-depth, zero-distance point, is placed in the center of the mask. The function is then plotted on one side of the y axis and repeated on the other side with symmetry about the origin, as shown in Fig. 3. However, it will be appreciated that if one wishes to examine a deep water problem in which the surface is not considered, the profile of the velocity function can be spread over the entire mask area and not just over one-half of it. It is desirable, in order to obtain quantitative results from the computer, that the mask always be plotted to the same scale. The mask itself may be prepared in any one of several different ways. For example, the mask may be cut from black paper or may be made photographically.

From the above description it will be seen that various objects of the invention have been achieved by the provision of a computer which will rapidly trace on a cathode ray tube a plurality of lines corresponding to ray paths emanating from a common source, but at different initial angles. If the horizontal and vertical scale factors are equal (so as to present a linear tangent function), the resulting display on the cathode ray tube gives a visual picture of a computed sound field, for example, with the density of traces at any point being indicative of the predicted sound intensity. Generally the computer is used with an expanded depth scale since the horizontal distances involved are much greater than the depth. In this case the ray trace is still accurately given but the density of the rays is not an accurate prediction of the sound intensity pattern.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for predicting the underwater sound pattern of a sound source, said apparatus comprising a pulse generator; a first integrator including an amplifier and a feedback capacitor coupling the output of the amplifier to the input; means for periodically setting an initial condition into the first integrator including a fixed source of potential, electronic switching means triggered by said pulse generator, the switching means momentarily coupling one end of the feedback capacitor of said first integrator to the fixed source of potential with each pulse from said pulse generator, a variable source of potential, means for continuously varying said last named source, and second electronic switching means triggered by said pulse generator, the switching means momentarily coupling the other end of the feedback capacitor of said first integrator to the variable source; a second integrator connected to the output of said first integrator and including an amplifier and a feedback capacitor coupling the output of the amplifier to the input; means for periodically setting an initial condition into the second integrator including a fixed source of potential, electronic switching means triggered by said pulse generator, the switching means momentarily coupling one end of the feedback capacitor of said second integrator to the fixed source of potential with each pulse from said pulse generator, a variable source of potential, and second electronic switching means triggered by said pulse generator, the switching means momentarily coupling the other end of the feedback capacitor of said second integrator to the variable source; an electronic function generator for producing an output signal whose magnitude is a predetermined function of the magnitude of an input signal, the output of the function generator being connected to the input of the first integrator and the input of the function generator being connected to the output of the second integrator; a sweep circuit synchronized with the output of the pulse generator; and a cathode ray tube having horizontal and vertical deflection means, the vertical deflection means being coupled to the output of the second integrator and the horizontal deflection means being coupled to the output of the sweep circuit.

2. Apparatus for predicting the underwater sound pattern of a sound source, said apparatus comprising a pulse generator; a first integrator including an amplifier and a feedback capacitor coupling the output of the amplifier to the input; means for setting an initial condition into the first integrator including a fixed source of potential and a variable source of potential; and means triggered by said pulse generator for momentarily connecting opposite ends of the feedback capacitor of said first integrator respectively to said variable source and said fixed source whereby a predetermined initial charge is placed on said capacitor; a second integrator connected to the output of said first integrator and including an amplifier and a feedback capacitor coupling the output of the amplifier to the input; means for setting an initial condition into the second integrator including a fixed source of potential and a variable source of potential, and means triggered by said pulse generator for momentarily connecting opposite ends of the feedback capacitor of said second integrator respectively to said variable source and said fixed source whereby a predetermined initial charge is placed on said capacitor; an electronic function generator for producing an output signal whose magnitude is a predetermined function of the magnitude of an input signal, the output of the function generator being connected to the input of the first integrator and the input of the function generator being connected to the output of the second integrator; a sweep circuit synchronized with the output of the pulse generator; a full wave rectifier, and a cathode ray tube having horizontal and vertical deflection means, the vertical deflection means being coupled by said full wave rectifier to the output of the second integrator and the horizontal deflection means being couple to the output of the sweep circuit.

3. Apparatus for predicting the underwater sound pattern of a sound source, said apparatus comprising a pulse generator, a first integrator including an amplifier and a feedback capacitor coupling the output of the amplifier to the input, means triggered by the pulse generator for setting an initial condition into the first integrator by inserting a predetermined charge on the feedback capacitor thereof, a second integrator connected to the output of said first integrator and including an amplifier and a feedback capacitor coupling the output of the amplifier to the input, means triggered by the pulse generator for setting an initial condition into the second integrator by inserting a predetermined charge on the feedback capacitor thereof, an electronic function generator for producing an output signal whose magnitude is a predetermined function of the magnitude of an input signal, the output of the function generator being connected to the input of the first integrator and the input of the function generator being connected to the output of the second integrator, a sweep circuit synchronized with the output of the pulse generator, a full wave rectifier, and a cathode ray tube having horizontal and vertical deflection means, the vertical deflection means being coupled to the output of the second integrator by said full wave rectifier and the horizontal deflection means being coupled to the output of the sweep circuit.

4. A computer comprising a pulse generator; a first integrator including capacitor; means for periodically setting an initial condition into the first integrator including a fixed source of potential, electronic switching means triggered by said pulse generator, the switching means momentarily coupling one end of the capacitor of said first integrator to said fixed source of potential with each pulse from said pulse generator, a variable source of potential, means for continuously varying said last named source, and second electronic switching means triggered by said pulse generator, the switching means momentarily coupling the other end of the capacitor of said first integrator to said variable source; a second integrator connected to the output of said first integrator and including a capacitor; means for periodically setting an initial condition into the second integrator including a fixed source of potential, electronic switching means triggered by said pulse generator, the switching means momentarily coupling one end of the capacitor of said second integrator to said fixed source of potential with each pulse from said pulse generator, a variable source of potential, and second electronic switching means triggered by said pulse generator, the switching means momentarily coupling the other end of the capacitor of said second integrator to said variable source; an electronic function generator for producing an output signal whose magnitude is a predetermined function of the magnitude of an input signal, the output of the function generator being connected to the input of the first integrator and the input of the function generator being connected to the output of the second integrator; and means for indicating the change in output voltage of the second integrator as a function of time.

5. A sound ray computer comprising, a first integrator including capacitor; means for setting an initial condition into the first integrator including a fixed source of potential and a variable source of potential, and means for momentarily connecting opposite ends of the capacitor of said first integrator respectively to said variable source and said fixed source whereby a predetermined initial charge is placed on said capacitor; a second integrator adapted to receive the output of said first integrator and including a capacitor; means for setting an initial condition into the second integrator including a fixed source of potential and a variable source of potential, and means for momentarily connecting opposite ends of the capacitor of said second integrator respectively to said variable source and said fixed source whereby a predetermined initial charge is placed on said capacitor; an electronic function generator for producing an output signal whose magnitude is a predetermined function of the magnitude of an input signal, the output of the function generator being connected to the input of the first integrator and the input of the function generator being connected to the output of the second integrator; a full wave rectifier, and means synchronized with the operation of both said initial condition setting means for indicating the change in output voltage of the second integrator as a function of time, said full wave rectifier interconnecting the output of the second integrator and the last-named means.

6. A computer comprising, a first integrator including an amplifier and a feedback capacitor coupling the output of the amplifier to the input, means for setting an initial condition into the first integrator by inserting a predetermined charge on the feedback capacitor of said first integrator, a second integrator adapted to receive the output of said first integrator and including an amplifier and a feedback capacitor coupling the output of the amplifier to the input, means for setting an initial condition into the second integrator by inserting a predetermined charge on the feedback capacitor of said second integrator, an electronic function generator for producing an output signal whose magnitude is a predetermined function of the magnitude of an input signal, the output of the function generator being connected to the input of the first integrator and the input of the function generator being connected to the output of the second integrator, a full wave rectifier, and means synchronized with the operation of both said initial condition setting means for indicating the change in output voltage of the second integrator as a function of time, said full wave rectifier interconnecting the output of the second integrator and the last-named means.

7. A computer comprising, a first integrator including a capacitor, means for setting an initial condition into the first integrator by inserting a predetermined charge on the capacitor of said first integrator, a second integrator adapted to receive the output of said first integrator and including a capacitor, means for setting an initial condition into the second integrator by inserting a predetermined charge on the capacitor of said second integrator, function generating means for producing an output voltage proportional to the quantity $$\frac{1}{V}\frac{dV}{dy}$$

in response to an input voltage proportional to $y$, where the dependent variable $V$ is related empirically to the independent variable $y$, the output of the function generating means being connected to the input of the first integrator and the input of the function generating means being connected to the output of the second integrator, a full wave rectifier, and means synchronized with the operation of both said initial condition setting means for indicating the change in output voltage of the second integrator as a function of time, said full wave rectifier interconnecting the output of the second integrator and the last-named means.

8. Apparatus comprising, a first integrator, means for setting an initial condition into the first integrator, a second integrator adapted to receive the output of said first integrator, means for setting an initial condition into the second integrator, an electronic function generator for producing an output signal whose magnitude is a predetermined function of the magnitude of an input signal, the output of the function generator being connected to the input of the first integrator and the input of the function generator being connected to the output of the second integrator, a full wave rectifier, and means synchronized with the operation of both said initial condition setting means for indicating the change in output voltage of the second integrator as a function of time, said full wave rectifier interconnecting the output of the second integrator and the last-named means.

9. Computer means for plotting sound rays including a first integrator, a second integrator connected to the output of the first integrator, an electronic function generator for producing an output signal that is a predetermined function of an input signal, the output of the function generator being coupled to the input of the first integrator, the input of the function generator being coupled to the output of the second integrator, adjustable means coupled to each of the integrators for setting the initial condition of said integrators, a sweep generator, a full wave rectifier, and a cathode ray tube having horizontal and vertical deflection means, the vertical deflection means being coupled by said full wave rectifier to the output of the second integrator, the horizontal means being coupled to the output of the sweep generator, an output pulse derived from the sweep generator being coupled to said adjustable means for periodically restoring the integrators to their initial condition as set by said adjustable means.

10. Computer means for plotting sound rays including a first integrator, a second integrator connected to the output of the first integrator, a function generator for producing an output that is a predetermined function of an input, the output of the function generator being coupled to the input of the first integrator, and the input of the function generator being coupled to the output of the second integrator, adjustable means coupled to each of the integrators for setting the initial condition of said integrators, a full wave rectifier, and means synchronized with the operation of each said initial condition setting means for indicating the change in output of the second integrator as a function of time, said full wave rectifier interconnecting the output of the second integrator and the last-named means.

11. Computer apparatus for solving the differential equation:

$$\ddot{y} = \frac{1}{V}\frac{dV}{dy}$$

where V is empirically related to $y$ according to measured data, said apparatus comprising means for generating an output voltage proportional to the quantity $$\frac{1}{V}\frac{dV}{dy}$$

in response to an input voltage proportional to $y$ as determined by said empirical relationship between V and $y$, a first integrator coupled to the output of said means, a second integrator coupled to the output of the first integrator, the output of the second integrator being coupled to the input of said means, means for setting initial conditions into said first and second integrators, a full wave rectifier, and means synchronized with the operation of both said initial condition setting means for indicating the change in output of the second integrator with time, said full wave rectifier interconnecting the output of the second integrator and the last-named means.

References Cited in the file of this patent

UNITED STATES PATENTS 2,612,621  Shepherd et al. _____ Sept. 30, 1952

OTHER REFERENCES

Proceedings of the National Electronics Conf. (Hancock), February 1952, pages 228–234.

Electronic Analog Computers (Korn and Korn), June 1952, pages 46–49; 247–250; 343 and 344.

Electronic Analog Computers (Korn and Korn), 1952; pages 226, 227, 289, 290 and 345.